United States Patent
Nesbeth

[19]

[11] Patent Number: 5,909,921
[45] Date of Patent: Jun. 8, 1999

[54] LIFT DEVICE AND SYSTEM FOR A PICK-UP TRUCK CARGO COVER

[76] Inventor: Roleto E. Nesbeth, 2910 SE. 8th Ave., Cape Coral, Fla. 33904

[21] Appl. No.: 08/835,958

[22] Filed: Apr. 11, 1997

[51] Int. Cl.[6] ................................................ B60P 7/02
[52] U.S. Cl. .......................... 296/100.1; 296/100.06; 296/37.6
[58] Field of Search ................. 296/100.1, 100.06, 296/100.07, 100.08, 100.09; 49/31, 137, 333, 373, 501; 92/61, 65, 76, 117 R, 62

[56] References Cited

U.S. PATENT DOCUMENTS

| | | | |
|---|---|---|---|
| 3,448,662 | 6/1969 | Mueller | 92/62 |
| 3,680,713 | 8/1972 | Langley | 92/62 |
| 3,904,416 | 9/1975 | Onoda et al. | 92/62 |
| 3,936,977 | 2/1976 | Runft et al. | 49/137 |
| 4,767,152 | 8/1988 | Stluka et al. | 296/100.1 |
| 4,798,115 | 1/1989 | Schmeck | 92/62 |
| 5,035,113 | 7/1991 | Simonyi et al. | 92/62 |
| 5,094,499 | 3/1992 | Simone, Jr. | 296/100 |
| 5,104,175 | 4/1992 | Enninga | 296/100.1 |
| 5,322,336 | 6/1994 | Isler | 296/100.1 |
| 5,344,159 | 9/1994 | Powell | 296/100 |
| 5,366,266 | 11/1994 | Harbison | 296/100 |
| 5,403,061 | 4/1995 | Mickowicz | 296/100 |
| 5,503,450 | 4/1996 | Miller | 296/100 |
| 5,585,482 | 12/1996 | Leonard | 92/62 |
| 5,681,074 | 10/1997 | Christensen | 296/100.06 |

FOREIGN PATENT DOCUMENTS

| | | |
|---|---|---|
| 405058162 | 3/1993 | Japan . |
| 405085186 | 4/1993 | Japan . |

OTHER PUBLICATIONS

Cargo Cover by Century, Century Truck Caps, 1131 D.I. Drive, Elkhart, IN 46514 (219) 264–7528, No Date.

*Primary Examiner*—Joseph D. Pape
*Assistant Examiner*—Kiran Patel
*Attorney, Agent, or Firm*—Kirkpatrick & Lockhart LLP

[57] ABSTRACT

A lift device for a cargo cover installed on a pickup truck. The lift device includes a first member, a second member, a first expansion device, and a second expansion device. The first member is mounted in the bed of a pickup truck. The second member has a first end and a second end, with the first end pivotally-connected to the first member. The first expansion device has a first end connected to the first member and has a second end connected to the second member. The second expansion device has a first end connected to the second end of the second member and has a second end for connection to the cargo cover.

20 Claims, 7 Drawing Sheets

LIFT DEVICE AND SYSTEM FOR A PICK-UP TRUCK CARGO COVER

BACKGROUND OF THE INVENTION

1. Field of the Invention

The present invention is directed generally to a lift device for raising and lowering a cargo cover on a pick-up truck.

2. Description of the Background

It is common for pick-up trucks to be modified to include a cover over the pick-up truck's cargo bed. Those covers are typically referred to as cargo covers or tonneau covers, and they have many uses, such as protecting items in the cargo bed from elements like rain and snow, preventing items in the cargo bed from being lost during transport, and securing items in the cargo bed from would-be thieves.

Some cargo covers are nothing more than a large sheet of rigid or flexible material, that must be manually installed and removed from the cargo bed. Many cargo covers include one or more access doors, that allow for access to the cargo bed without removing the cargo cover. Still other cargo covers are pivotally attached to the cargo bed, typically at the edge of the cargo bed near the cab of the truck, so that the cargo cover may be opened to allow access to the cargo bed. Some cargo covers also include gas-charged cylinders to assist in opening the cargo cover for access to the cargo bed. Some cargo covers even include fluid-operated cylinders, gas or hydraulic, to open the cargo cover at the press of a button.

The prior art cargo cover lift mechanisms have several deficiencies attributable to the lift mechanisms used to raise the cargo covers. Those mechanisms typically include two or more fluid-operated cylinders spaced to equally share the burden of lifting the cargo cover. Each cylinder is attached at one end to the cargo bed and is attached at another end to the cargo cover. It is well known that the construction of such cylinders limits their expanded length to approximately twice their compressed length. Fluid assisted cargo covers that are hinged along one edge will typically include cylinders near either the hinged edge or near the opening edge. If the cylinder is located near the opening edge, it will usually open the cargo cover a distance approximately equal to the depth of the cargo bed, creating a relatively narrow opening in the cargo cover. In contrast, if the cylinders are located near the hinged edge, they will allow the cargo cover to open significantly more, but will require larger gas or hydraulic pumps and larger cylinders to compensate for a loss in leverage caused by lifting the cargo cover near its pivot point. Larger pumps and cylinders are more expensive, heavier, and require more space in the cargo bed.

Thus, the need exists for a small lift device that provides for wide opening of the cargo cover.

SUMMARY OF THE INVENTION

The present invention is directed to a lift device for a cargo cover installed on a pickup truck. The lift device includes a first member, a second member, a first expansion device, and a second expansion device. The first member is mounted in the bed of a pickup truck. The second member has a first end and a second end, with the first end pivotally-connected to the first member. The first expansion device has a first end connected to the first member and has a second end connected to the second member. The second expansion device has a first end connected to the second end of the second member and has a second end for connection to the cargo cover.

The present invention is also directed to a lift system for a cargo cover. The lift system includes at least one lift device constructed in accordance with the present invention. The system also includes a position sensor responsive to the cargo cover for producing a position signal indicative of the position of the cargo cover, and a control circuit responsive to the position sensor and responsive to a control signal. The control signal is provided by a user to prompt the cargo cover to open or to close. The control circuit controls the lift device. In a preferred embodiment, the lift device is hydraulically operated and the lift system includes a hydraulic system controlled by the control system for activating the lift device.

The present invention solves problems inherent in the prior art by providing a small lift device and system that provides a large range of lift, allowing a cargo cover to be opened wide. The lift device is relatively small when it is closed. Furthermore, the preferred embodiment of the present invention opens the cargo cover smoothly and quickly by operating the expansion devices in a predetermined manner. Those and other advantages and benefits of the present invention will become apparent from the description of the preferred embodiments hereinbelow.

BRIEF DESCRIPTION OF THE DRAWINGS

For the present invention to be clearly understood and readily practiced, the present invention will be described in conjunction with the following figures, wherein.

DESCRIPTION OF THE PREFERRED EMBODIMENTS

It is to be understood that the figures and descriptions of the present invention have been simplified to illustrate elements that are relevant for a clear understanding of the present invention, while eliminating, for purposes of clarity, other elements that may be found in a cargo cover and an associated lift mechanism and system. Those of ordinary skill in the art will recognize that other elements are desirable and/or required to implement the present invention. However, because such elements are well known in the art, and because they do not facilitate a better understanding of the present invention, a discussion of such elements is not provided herein.

Figure 1:
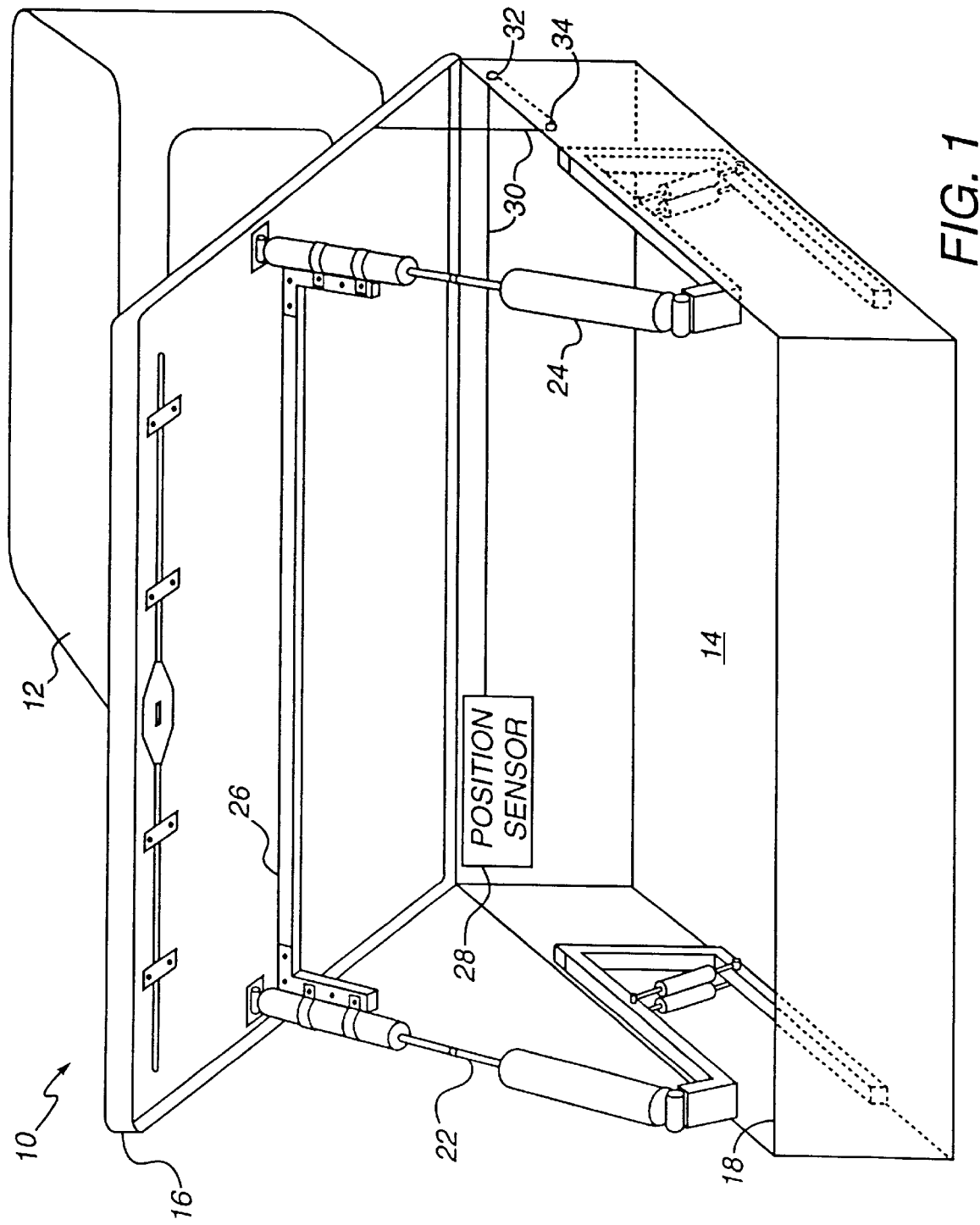
FIG. 1 is an elevational view of a pick-up truck utilizing cargo cover lift devices constructed in accordance with the present invention.

FIG. 1 is a rear elevational view of a pick-up truck 10 having a cab 12, a cargo bed 14, a cargo cover 16, and a tailgate 18. The cover 16 is pivotally attached to the bed 14 near the cab 12 of the truck 10. The cover 16 is raised and lowered with first and second lift devices 22, 24 and a stabilizing bar 26. The lift devices 22, 24 are preferably positioned near the rear of the bed 14, away from the pivot portion of the cover 16 in order to increase leverage when raising and lowering the cover 16. Although the stabilizing bar 26 is not required to operate the present invention, it is preferably included because it increases the rigidity of the system and equalizes the force applied by the lift devices 22, 24 in the event that one of the lift devices 22, 24 provides more force than the other. A position sensor 28 senses the position of the cover 16 by means of a wire 30 connected to the cover 16. The wire 30 is routed along the bed 14 via several small pulleys or eyelets 32, 34. The position sensor 28 is preferably attached to the bed 14 of the truck 10 and is described in more detail hereinbelow with respect to FIG. 5. The position sensor 28 forms part of a lift system, which is described in more detail hereinbelow with respect to FIG. 3.

Figure 2:
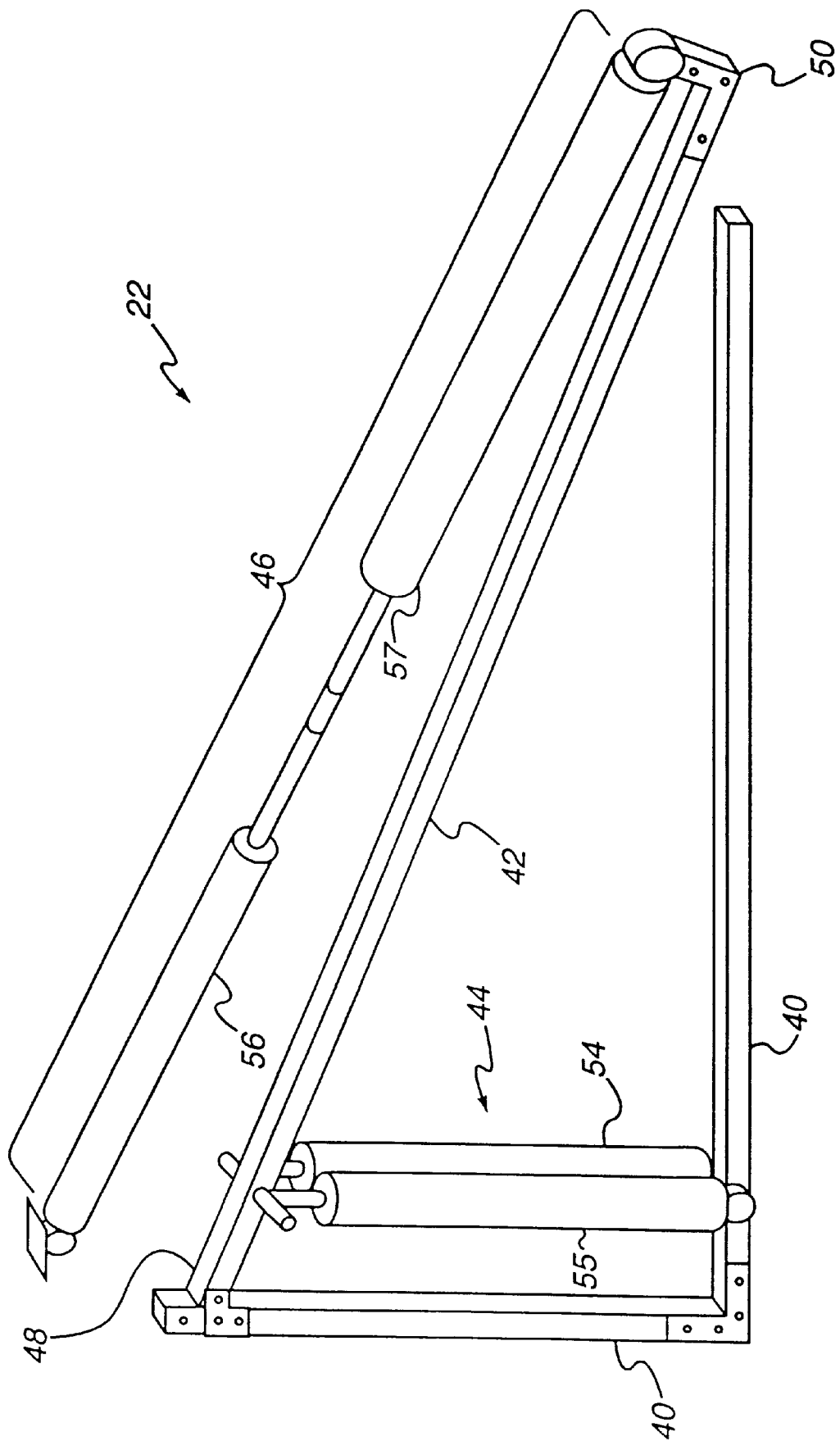
FIG. 2 is a perspective view of one of the lift devices illustrated in FIG. 1.

FIG. 2 is a perspective view of lift device 22 illustrated in FIG. 1. Because the lift devices 22, 24 are substantially the same, the description of lift device 22 is also an accurate description of lift device 24. The lift device 22 includes a first member 40, a second member 42, a first expansion device 44, and a second expansion device 46. The first member 40 is for attachment to the cargo bed 14 (shown in FIG. 1) and has an angled shape. In the preferred embodiment, the first member 40 has an angled shape of approximately ninety degrees, although other angles may be used. The second member 42 has a first end 48 and a second end 50, with the first end 48 being pivotally attached to the first member 40 and the second end 50 being pivotally attached to the second expansion device 46. The first expansion device 50 is connected to both the first member 40 and the second member 42, and moves the first and second members 42, 44 relative to each other. The second expansion device 46 is connected to both the second member 42 and cargo cover 16 (shown in FIG. 1), and moves the second member 42 and cargo cover 16 relative to each other.

The first and second members 42, 44 may be constructed from many materials with dimensions and strength dictated by the particular application. In the preferred embodiment, a one inch square cross-sectional metal tube is used.

Each of the first and second expansion devices 44, 46 are preferably formed from a pair of hydraulic cylinders. The first expansion device 44 is preferably formed from a pair of parallel-connected cylinders 54, 55 and the second expansion device 46 is preferably formed from a pair of series-connected cylinders 56, 57. Alternatively, more than two cylinders may be used to form the expansion devices 44, 46. Each of the first and second expansion devices 44, 46 may also be formed from a single cylinder. Although the expansion devices 44, 46 are formed from hydraulic devices in the preferred embodiment, other forms of fluid-operated expansion devices may also be used. For example, the expansion devices 44, 46 may be formed from devices that are operated with a gas, such compressed air. In an alternative embodiment, the first and second expansion devices 44, 46 may be electrically operated and formed, for example, from solenoids.

Figure 3:
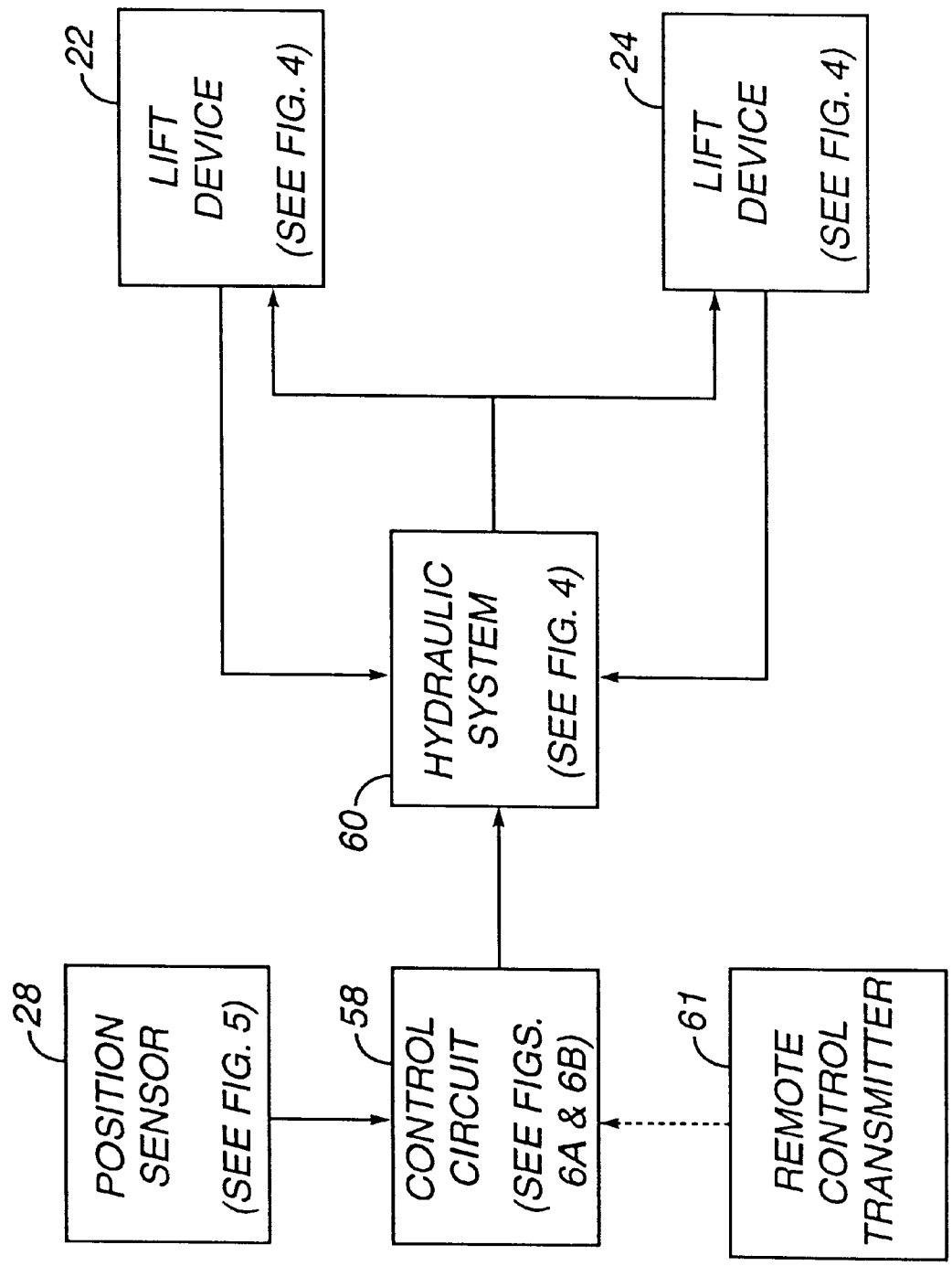
FIG. 3 is a block diagram illustrating a lift system constructed in accordance with the present invention.

FIG. 3 is a block diagram illustrating a lift system including the position sensor 28, a control circuit 58, and a hydraulic system 60 used to control the lift devices 22, 24. Also illustrated is a remote control transmitter 61 that may be used to provide control signals to the control circuit 58. The hydraulic system 60 controls the flow of hydraulic fluid to and from the lift devices 22, 24. The control circuit 58 controls the hydraulic system 60 so that the lift devices 22, 24 operate on command. The control circuit 58 receives feedback signals indicative of the position of the cargo cover (shown in FIG. 1) from the position sensor 28. In the preferred embodiment, the remote control transmitter 61 is used to transmit signals indicative of when the lift devices 22, 24 need to be operated. In an alternative embodiment, the hydraulic system 60 may be replaced or eliminated. For example, if the first and second expansion devices 44, 46 are air-operated, the hydraulic system 60 may be replaced by one or more air compressors and valves. In another alternative embodiment, if the first and second expansion devices 44, 46 are formed from solenoids, the hydraulic system 60 may be eliminated and the solenoids controlled directly by the control circuit 58.

Figure 4:
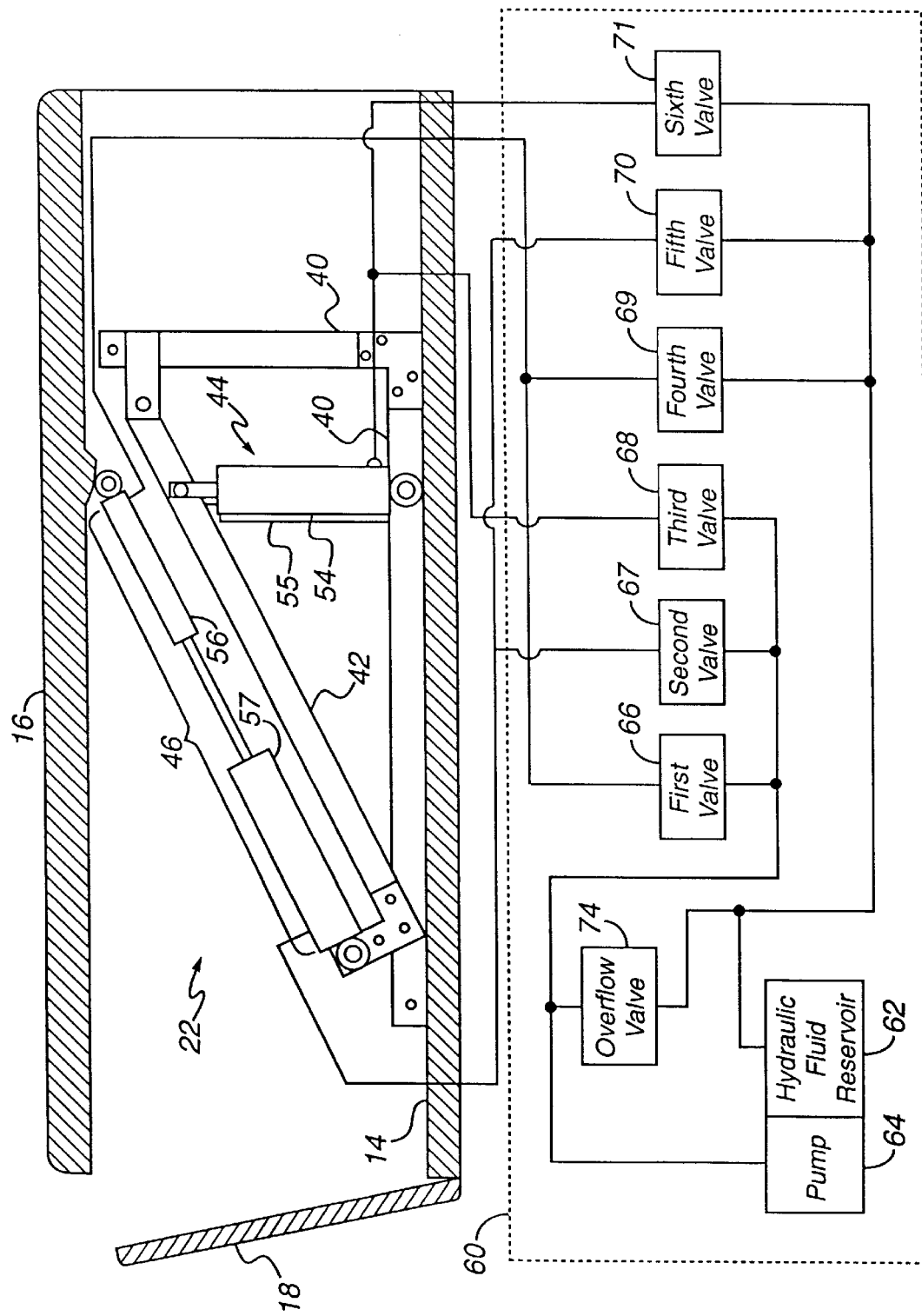
FIG. 4 is a combination cross-sectional view and block diagram illustrating a lift device and cargo cover installed in the bed of a truck, and illustrating the hydraulic system illustrated in FIG. 3.

FIG. 4 is a combination cross-sectional view and block diagram illustrating the lift device 22, the cargo cover 16, and the hydraulic system 60. The hydraulic system 60 includes a hydraulic fluid reservoir 62, a hydraulic pump 64, and six valves 66, 67, 68, 69, 70, 71. The valves 66–71 and pump 64 are controlled by the control circuit 36, which is illustrated in more detail in FIGS. 6A and 6B. Twelve valves may be provided if the first and second lift devices 22, 24 are separately controlled.

The valves 66–71 control the flow of the hydraulic fluid to and from the first and second expansion devices 44, 46. First and second valves 66, 67 separately control the flow of hydraulic fluid to each of the cylinders 56, 57, respectively. The third valve 68 controls the flow of hydraulic fluid to both cylinders 54, 55 forming the first expansion device 44. Fourth and fifth valves 69, 70 separately control the flow of hydraulic fluid back to the hydraulic fluid reservoir 62 from each of the cylinders 56, 57, respectively, forming the second expansion device 46. The sixth valve 71 controls the flow of hydraulic fluid back to the hydraulic fluid reservoir 62 from the cylinders 54, 55 forming the first expansion device 44.

An overflow valve 74 is preferably included in the hydraulic system 60 to provide a path for excessive hydraulic fluid to flow when the system 60 is not in use. It has been found that when the present invention is heated, as it would be when installed in a truck that is parked in the sun, the hydraulic fluid in the hydraulic fluid reservoir 62 will expand, flow through an open fifth valve 70, and the lift device 22 will begin to open the cargo cover 16. The reason the fifth valve 70 remains open is described hereinbelow with respect to FIGS. 6A and 6B. When the overflow valve 74 is open, it provides space for expanding hydraulic fluid without causing the cargo cover 16 to be raised. The overflow valve 74 is normally open, and only closes when the system is in use.

In the preferred embodiment, the hydraulic system 60 is used to control both the first and second lift devices 22, 24. In that embodiment, the first and second lift devices 22, 24 are connected to the hydraulic system 60 in parallel so that they receive hydraulic fluid at the same time and same pressure to open the cargo cover 16 evenly.

It has been found that superior results are achieved when the first and second expansion devices 44, 46 are separately controlled, as described hereinbelow with respect to FIGS. 6A and 6B. However, it is possible to use the present invention with other combinations of valves and cylinders. For example, a single valve may control hydraulic fluid to both cylinders 56, 57 forming the second expansion device 46, and another valve may control hydraulic fluid returning to the reservoir 62. Alternatively, the second expansion device 46 may be formed from a single hydraulic cylinder and may use only two valves, one for supplying hydraulic fluid and another for returning hydraulic fluid to the reservoir 62. In another embodiment, one valve may be used to supply hydraulic fluid to both the first and second expansion devices 44, 46, and another valve used to return fluid to the reservoir 62. Other combinations, of course, are possible.

Figure 5:
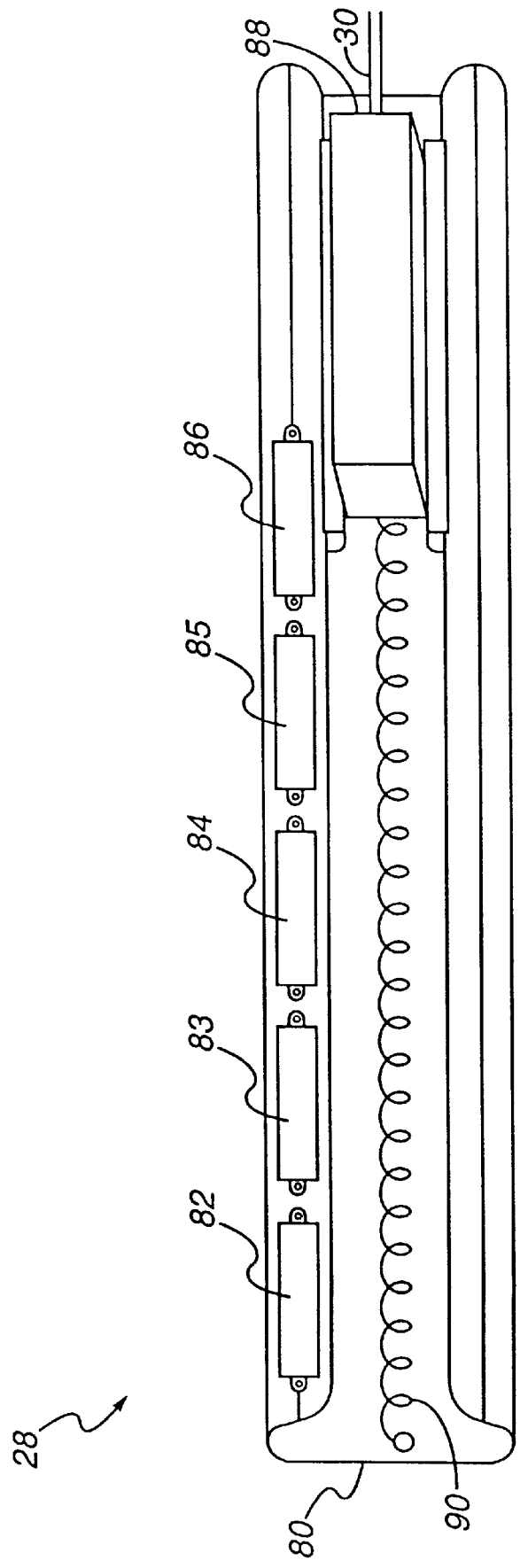
FIG. 5 is a perspective view of the position sensor illustrated in FIG. 1.

FIG. 5 is a perspective view of the position sensor 28 illustrated in FIG. 1. The sensor 28 includes a track 80 having five magnetic sensors 82, 83, 84, 85, 86 mounted thereon. A magnet 88 is attached to the wire 30 (also shown in FIG. 1) and is slideably engaged with the track 80. A spring 90 is connected between the track 80 and the magnet 88 to bias the magnet 88 towards the end of the track 80 near the first sensor 82. The magnet 88 is pulled by the wire 30 along the track 80 from left to right when the cargo cover 16 is opened. The purpose of the spring 90 is to keep the wire 30 taut and to move the magnet 88 from right to left along the track 80 when the cargo cover 16 is being closed. Without the spring 90, there is no force to move the magnet 88 from right to left along the track 80 and the magnet 88 will remain stationary when the cargo cover 16 is being closed. In an alternative embodiment, the spring 90 may be eliminated by mounting the position sensor 28 so that the track 80 is oriented vertically with the first sensor 82 at the bottom and the fifth sensor 86 at the top. In that embodiment, gravity will act on the magnet 88 to perform the function of the spring 90.

As the magnet 88 moves along the track 80, it is detected by the sensors 82–86 which generate signals indicative of the position of the magnet 88. From the position of the magnet 88, the position of the cargo cover 16 can be determined. If the magnet 88 moves from right to left along the track 80, it will first be detected by the fifth sensor 86, and then by the fourth, third, and second sensors 85, 84, 83, respectively, and finally by the first sensor 82 as the magnet 88 approaches the end of the track 80. The wire 30 is attached to the cargo cover 16, as illustrated in FIG. 1, so that the first sensor 82 detects the magnet 88 when the cargo cover 16 is closed, the fifth sensor 86 detects the magnet 88 when the cargo cover 16 is fully open, and the second, third, and fourth sensors 83–85 detect the magnet 88 when the cargo cover 16 is at positions between full open and closed. FIG. 5 illustrates the position sensor 28 with the cargo cover 16 in the full open position.

Figure 6A:
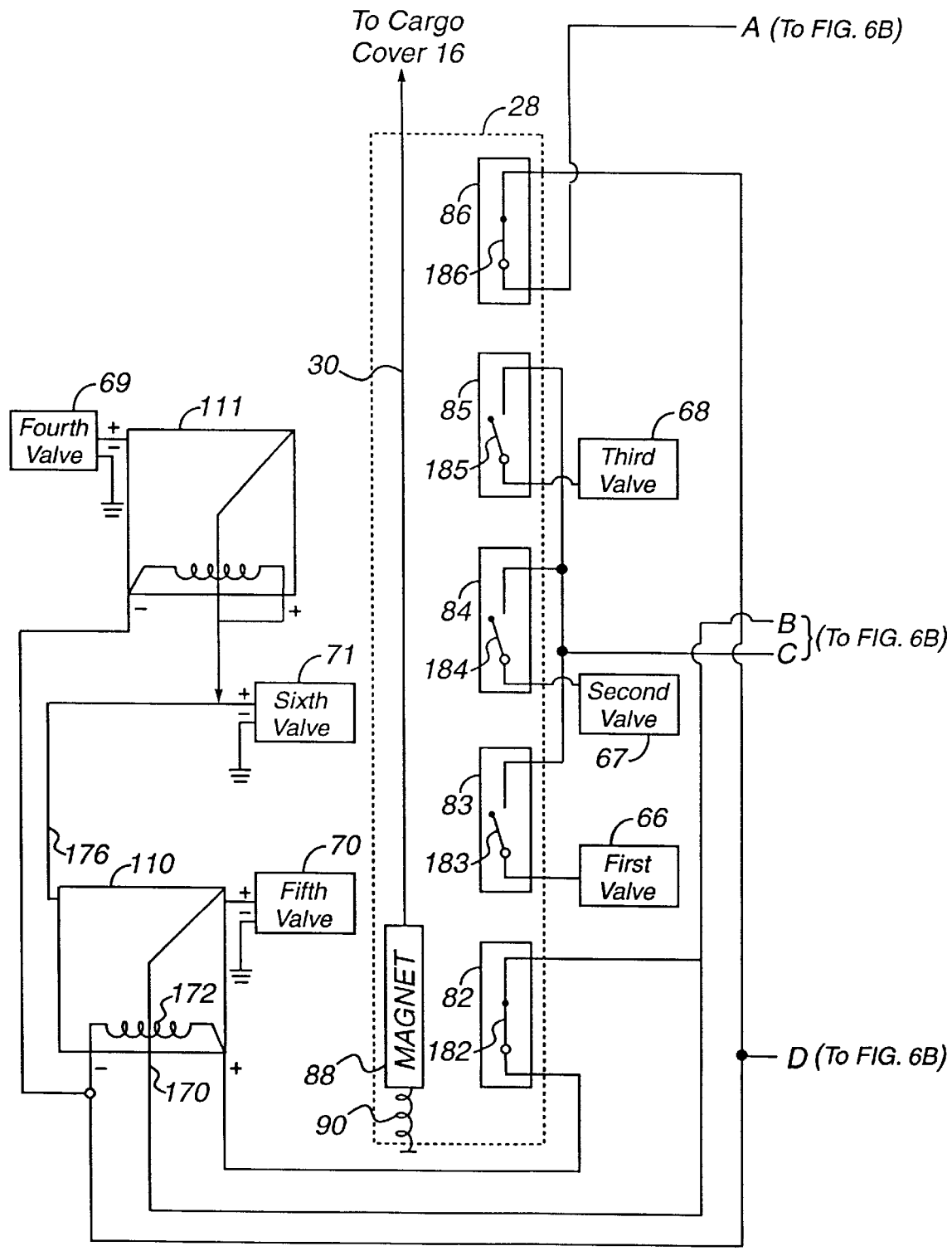
FIGS. 6A and 6B are combination block diagrams and circuit schematics illustrating the control circuit illustrated in FIG. 3.
Figure 6B:
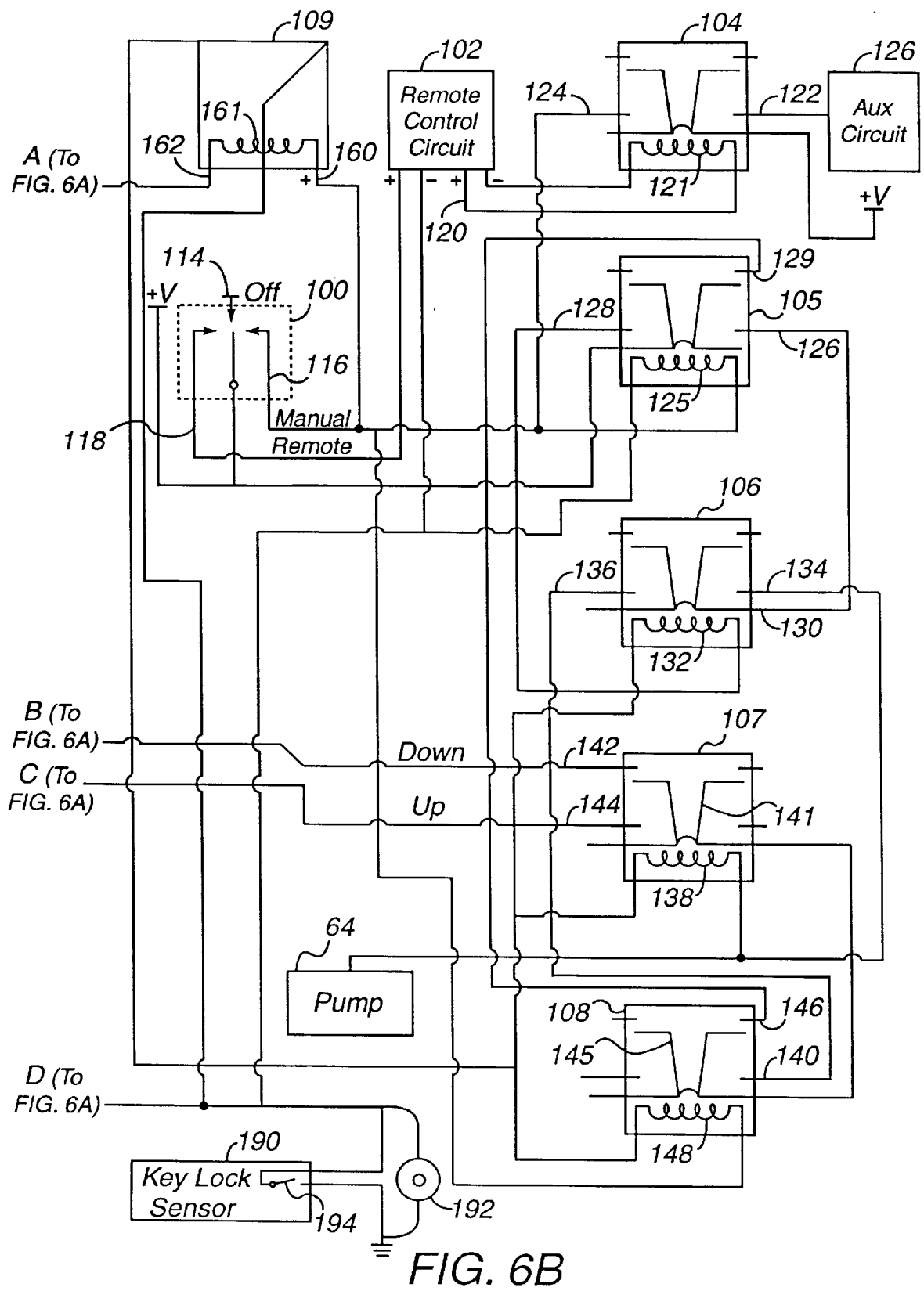

FIGS. 6A and 6B are combination block diagrams and circuit schematics illustrating the control circuit 58. The control circuit 58 includes a switch 100, a remote control circuit 102, and eight relays 104, 105, 106, 107, 108, 109, 110, 111. The control circuit 58 uses the position sensor 28 to control the valves 66–71 in the hydraulic system 60. The position sensor 28 includes sensors 82–86, illustrated as switches 182–186, respectively. Switches 182, 186 are normally closed, and they open when the magnet 88 is detected. Switches 183–185 are normally open, and they close when the magnet 88 is detected. For clarity, and to aid in the understanding of the present invention, the magnet 88 is illustrated in FIG. 6A, but its effect on the switches 182–186, is not illustrated. Instead, those switches 182–186 are illustrated in their normal position. The control circuit 58 receives power in the form of twelve volts from the battery of the vehicle. Other sources of power may also be used.

The switch 100 allows a user to selectively enable the control circuit 58, and to select between manual operation and remote control operation. When the switch 100 is in the off position 114, the lift devices 22, 24 (shown in FIGS. 1 and 2) cannot be operated. When the switch 100 is placed in the manual position 116, the lift devices 22, 24 will immediately begin raising the cargo cover 16. When the switch 100 is in the remote position 118, the remote control circuit 102 will be enabled and the lift devices 22, 24 will lift the cargo cover 16 when the remote control circuit 102 receives a signal from the remote control transmitter 61 (shown in FIG. 3).

If the remote control circuit 102 is enabled, it will produce a signal at terminal 120 when it detects a control signal from the remote control transmitter 61. The signal at terminal 120 is maintained until a second control signal from the transmitter 61 is detected, at which time the signal is removed from terminal 120. That cycle is repeated when the remote control circuit 102 detects subsequent signals from the transmitter 61. The signal from terminal 120 propagates through a coil 121 in relay 104, and energizes the relay 104 to provide power at terminals 122, 124. Terminal 122 is connected to an auxiliary circuit 126 that is used in the preferred embodiment to illuminate a light (not shown) in the bed 14 of the truck 10 when the cargo cover 16 is opened. The auxiliary circuit 126 may control other devices, or may be eliminated. If it is eliminated, relay 104 may also be eliminated, and terminal 120 from remote control circuit 102 may instead be connected to terminal 116 on the switch 100. Terminal 124 is connected to switch terminal 116, to a coil 125 in relay 105, through terminal 160 to coil 161 in relay 109, and to coil 148 in relay 108.

When relay 105 is energized, power is provided at terminals 126, 128. The coil 125 may be energized via terminal 124 when relay 104 is energized, or via terminal 116 when switch 100 is placed in the manual position. Terminal 126 provides power to the pole of relay 106 through terminal 130. Terminal 128 provides power to coil 132 of relay 106.

When relay 106 is energized and power is provided at terminal 130, power is provided at terminals 134, 136. Terminal 134 is connected to coil 138 of relay 107 and is also connected to pump 64. Terminal 136 is connected to terminal 140 of relay 108.

Relay 107 has a pole 141 that is connected to a pole 145 of relay 108. When relay 107 is not energized, its pole 141 is connected to terminal 142. When relay 107 is energized, its pole 141 is connected to terminal 144.

When relay 108 is not energized, its pole 145 is connected to terminal 146, which is connected to terminal 129 of relay 105. When relay 108 is energized, its pole 145 is connected to terminal 140, which is connected to terminal 136 of relay 106.

Relay 109 is used to provide a ground for the relay coils 132, 138, 148 of relays 106, 107, 108, respectively. When relay 109 is not energized, no ground is provided to those coils 132, 138, 148. When relay 109 is energized, however, the ground is provided for those coils 132, 138, 148, and the relays 106–108 can be energized. Relay 109 receives power when switch 100 is placed in the manual position, because power is provided through switch 100, through terminal 116, and into terminal 160. When switch 100 is placed in the remote position, relay 109 receives power when remote control circuit 102 energizes relay 104 and power is provided through terminal 124 into terminal 160. Relay 109 receives ground through terminal 162 and switch 186. Switch 186 is normally closed and provides ground to relay 109 except when magnet 88 is near sensor 86, indicating that the cargo cover 16 is in a fully open position. When that occurs, switch 186 opens, ground is removed from terminal 162, relay 109 is deenergized, ground is removed from coils 132, 138, 148, and relays 106, 107, 108 are deenergized.

Relays 110, 111 control the fourth, fifth, and sixth valves 69–71 in the hydraulic system 60. Those valves 69–71 control the flow of hydraulic fluid out of the lift devices 22, 24, allowing the cargo cover 16 to close. Relay 110 includes a coil 172 that receives power through switch 182. The switch 182 is normally closed except when the magnet 88 is near sensor 82, indicating that the cargo cover 16 is closed, at which time the switch 182 is open. When relay 110 is energized, it provides power through terminal 176 to sixth valve 71 and to relay 111. Relay 111 controls power to the fourth valve 69.

The present invention preferably includes safety devices in the form of a keylock sensor 190 and a buzzer 192. The keylock sensor 190 opens a switch 194 when the cargo cover 16 is locked. That open switch 194 removes ground from relays 105–111 and prevents the lift devices 22, 24 from exerting pressure on the cargo cover 16 when the cargo cover 16 is locked. Furthermore, if the user attempts to open the cargo cover 16 and the switch 194 is open, the buzzer 192 is energized to alert the user to the fact that the cargo cover 16 is locked and will not open.

Operation of the control circuit 58 begins when switch 100 is positioned in either the manual or the remote position. If switch 100 is positioned in the remote position, power is provided through terminal 118 to enable the remote control circuit 102. When remote control circuit 102 is enabled, it waits to receive a signal from the transmitter 61 (shown in FIG. 3). When the signal is received from the transmitter 61, remote control circuit 102 generates a signal at terminal 120. That signal begins a chain of events that causes relays 104–109 to be energized and starts pump 64. That chain of events begins when the signal from terminal 120 flows through coil 121 and energizes relay 104. Power is provided through terminal 124 to energize relays 105, 108, 109. When relay 105 is energized, power is provided through terminal 128 and coil 132 to energize relay 106. When relay 106 is energized, power is provided through terminal 134 to energize relay 107 through coil 138, and to turn on pump 64. Energizing relay 106 also provides power through terminal 136, through terminal 140 of relay 108, through pole 145 of relay 108, and into the pole 141 of relay 107. Because relay 107 is energized, power is provided through terminal 144 to switches 183–185. Those switches 183–185 are normally open, except when magnet 88 is near their respective sensors 83–85.

If switch 100 is positioned in the manual position, a chain of events causes relays 105–109 to be energized and starts pump 64. That chain of events is the same as the one described hereinabove when switch 100 is positioned in the remote position, except that relays 105, 108, 109 are energized by a signal from terminal 116 of switch 100 and relay 104 is not energized.

When the cargo cover 16 is closed, the magnet 88 is near sensor 82, causing switch 182 to open and preventing relays 110, 111 from being energized. Even when the cargo cover 16 is in the closed position, the magnet 88 can still be sensed by sensor 83, resulting switch 183 being closed. The power provided to switch 183 from terminal 144 of relay 107 causes the first valve 66 to open, allowing hydraulic fluid to be pumped into the cylinder 56 forming part of the second expansion device 46 (shown in FIGS. 2 and 4). That causes the second expansion device 46 to begin to expand and the cargo cover 16 to begin to open. As the cargo cover 16 opens, the magnet 88 is pulled by cable 30 past sensor 83 towards sensor 84. As magnet 88 approaches sensor 84, switch 184 closes, providing power to the second valve 67, resulting in the other cylinder 57 forming the second expansion device 46 to begin to expand, and causing the cargo cover 16 to open even more. As the magnet 88 continues to move, switch 183 eventually opens, closing the first valve 66. The cargo cover 16 continues to be opened by fluid flowing through the second valve 67. As the magnet 80 approaches the sensor 85, switch 185 closes, causing the third valve 68 to open, resulting in hydraulic fluid being provided to the cylinders 54, 55 forming the first expansion device 44, and causing the cover 16 to continue to open. Eventually, switch 184 opens and the second valve 67 closes.

As the cargo cover 16 reaches the full open position, either switch 185 will open or switch 186 will open, and the cargo cover 16 will stop. If switch 185 opens, the third valve 68 will close and no more hydraulic fluid will be provided to the lift devices 22, 24. If switch 186 opens, relay 109 will be deenergized, resulting in relays 106–108 being deenergized, power being removed from switches 183–185 so that all valves 66–68 will be closed, and the pump 64 being turned off. Preferably, the position sensor 28 is designed so that switch 186 will always open when the cargo cover 16 reaches the full open position. Otherwise, relays 106–109 and pump 64 will remain energized, consuming power.

When relay 107 is deenergized, as occurs when switch 186 is open, power is removed from terminal 144 and switches 183–185. Power is still not present on terminal 142, however, because relay 105 remains energized, leaving terminal 129 of relay 105 open. The state of the control circuit 36 remains unchanged until the cargo cover 16 is closed.

The cargo cover 16 is lowered by removing power from relay 105. That may be done by positioning switch 100 in the off position at terminal 114. Alternatively, if the remote control circuit 102 is being used and another signal from the transmitter 61 is detected, then power is removed from terminal 120, and relays 104, 105 are deenergized.

When relay 105 is deenergized, power is provided through terminal 129 of relay 105, through terminal 146 of relay 108, through the pole 145 of relay 108, through the pole 141 of relay 107, through terminal 142 of relay 107, and through sensor 82 and switch 174 to energize relay 110.

When relay 110 is energized, power is provided through terminal 176 of relay 110 to open the sixth valve 71, to energize relay 111, and to open the fourth valve 69.

When the fourth and sixth valves 69, 71 are open, hydraulic fluid begins to drain from the lift devices 22, 24 and the cargo cover 16 begins to close under its own weight. The sensors 83–86 are not used when the cargo cover 16 is being closed. When magnet 88 is detected by sensor 82, switch 174 is opened, deenergizing relays 110, 111, closing the fourth valve 69 and the sixth valve 71, and opening the fifth valve 70 with power flowing through terminal 170 of relay 110. Hydraulic fluid flows through the fifth valve 70 to allow the cargo cover 16 to completely close. The fifth valve 70 remains open until power is removed from the control circuit 36. The cargo cover 16 may be opened again, as described hereinabove, by either moving switch 100 to the manual position, or by moving switch 100 to the remote position and remote circuit 102 detecting a signal from a transmitter 61.

Those of ordinary skill in the art will recognize that many modifications and variations of the present invention may be implemented. For example, although the lift devices 22, 24 are preferably located in the rear of the bed 14, they may also be located near the cab 12, or at any other point within the bed 14. In addition, a single lift device may be located in the center of the bed 14, as opposed to two lift devices 22, 24 located along the sides of the bed 14. Furthermore, if a very rigid cover 14 is used, it may be possible to use a single lift device 22 located at the side of the bed 14 to raise and lower the cover 14. The foregoing description and the following claims are intended to cover all such modifications and variations.

What is claimed is:

1. A lift device, comprising:

a first member;

a second member having a first end pivotally-connected to said first member and having a second end;

a first expansion device having a first end connected to said first member and having a second end connected to said second member; and a second expansion device having a first end connected to said second end of said second member and having a second end.

2. The lift device of claim 1, wherein said first and second expansion devices are operated with a fluid.

3. The lift device of claim 2, wherein said first and second expansion devices are operated with a liquid fluid.

4. The lift device of claim 2, wherein said first and second expansion devices are operated with a gaseous fluid.

5. The lift device of claim 2, wherein said first expansion device includes two fluid-operated devices connected in parallel.

6. The lift device of claim 2, wherein said second expansion device includes two fluid-operated devices connected in series.

7. The lift device of claim 1, wherein said first member has an angled shape.

8. The lift device of claim 7, wherein said first member has an angled shape of approximately ninety degrees.

9. The lift device of claim 1, wherein said first and second expansion devices are operated with electricity.

10. The lift device of claim 9, wherein said first and second expansion devices include solenoids.

11. A lift system for a cargo cover, comprising:

a first lift device including a first member, a second member having a first end pivotally-connected to said first member and having a second end, a first expansion device having a first end connected to said first member and having a second end connected to said second member, and a second expansion device having a first end connected to said second end of said second member and having a second end for connection to the cargo cover;

a position sensor responsive to the cargo cover for producing a position signal indicative of the position of the cargo cover;

a control circuit responsive to said position sensor and responsive to a control signal, said control circuit for controlling said first lift device.

12. The system of claim 11, wherein said control circuit is responsive to a control signal produced by a switch.

13. The system of claim 11, wherein said control circuit is responsive to a control signal produced by a remote control transmitter.

14. The system of claim 11, further comprising a hydraulic system responsive to said control circuit and including a plurality of valves for operating said first lift device.

15. The system of claim 14, wherein said plurality of valves control the flow of hydraulic fluid to and from said first lift device.

16. The system of claim 11, further comprising a second lift device including a first member, a second member having a first end pivotally-connected to said first member and having a second end, a first expansion device having a first end connected to said first member and having a second end connected to said second member, and a second expansion device having a first end connected to said second end of said second member and having a second end for connection to the cargo cover, said second lift device being controlled by said control circuit.

17. A lift system, comprising:

a cargo cover;

a first lift device including a first member, a second member having a first end pivotally-connected to said first member and having a second end, a first expansion device having a first end connected to said first member and having a second end connected to said second member, and a second expansion device having a first end connected to said second end of said second member and having a second end for connection to said cargo cover;

a position sensor responsive to said cargo cover for producing a position signal indicative of the position of the cargo cover;

a control circuit responsive to said position sensor and responsive to a control signal, said control circuit for controlling said first lift device.

18. The system of claim 17, further comprising a hydraulic system responsive to said control circuit and including a plurality of valves for operating said first lift device.

19. The system of claim 18, wherein said plurality of valves control the flow of hydraulic fluid to and from said first lift device.

20. The system of claim 17, further comprising a second lift device including a first member, a second member having a first end pivotally-connected to said first member and having a second end, a first expansion device having a first end connected to said first member and having a second end connected to said second member, and a second expansion device having a first end connected to said second end of said second member and having a second end for connection to the cargo cover, said second lift device being controlled by said control circuit.

* * * * *